United States Patent Office 3,437,675
Patented Apr. 8, 1969

3,437,675
16-HALO-9β,10α-STEROIDS OF THE PREGNANE SERIES
Engbert Harmen Reerink, Pieter Westerhof, and Hendrik Frederik Louis Scholer, Van Houtenlaan, Weesp, Netherlands, assignors to North American Philips Company, Inc., New York, N.Y., a corporation of Delaware
No Drawing. Continuation of application Ser. No. 472,703, July 16, 1965. This application Aug. 30, 1967, Ser. No. 664,568
Int. Cl. C07c *169/30, 169/34*
U.S. Cl. 260—397.3          5 Claims

ABSTRACT OF THE DISCLOSURE

Novel 16-halo-9β,10α pregnanes are disclosed, for example 16α-fluoro19β,10α-pregn-4-ene-3,20-dione and 16α-bromo-9β,10α pregna-1,4,6-triene-3,20-dione. The compounds are progestationally active. As a starting material 16α-acetoxy - 9β,10α - pregna-4,6-diene-3,20-dione is disclosed.

---

This application is a continuation of our copending application Ser. No. 472,703 filed July 16, 1965, now abandoned.

This invention relates to novel 16-halogen-9β,10α-pregnanes of the general Formula I

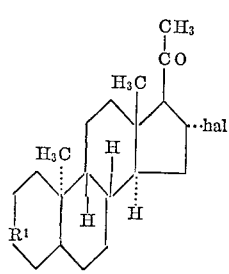

(I)

wherein $R^1$ represents a 3-keto-$\Delta^4$-, 3-keto-$\Delta^{4,6}$-, 3-keto-$\Delta^{1,4}$-, 3-keto-$\Delta^{1,4,6}$-, 3-alkoxy-$\Delta^{3,5}$-, or a 3-acyloxy-$\Delta^{3,5}$-system, and hal represents a chloro, bromo or fluoro atom, and a process for the manufacture thereof.

Examples of 16-halogen-9β,10α-pregnanes of the general Formula I are:

16α-fluoro-9β,10α-pregn-4-ene-3,20-dione
16α-chloro-9β,10α-pregn-4-ene-3,20-dione
16α-bromo-9β,10α-pregn-4-ene-3,20-dione
16α-fluoro-9β,10α-pregna-4,6-diene-3,20-dione
16α-chloro-9β,10α-pregna-4,6-diene-3,20-dione
16α-bromo-9β,10α-pregna-4,6-diene-3,20-dione
16α-fluoro-9β,10α-pregna-1,4,6-triene-3,20-dione
16α-chloro-9β,10α-pregna-1,4,6-triene-3,20-dione
16α-bromo-9β,10α-pregna-1,4,6-triene-3,20-dione
16α-fluoro-9β,10α-pregna-1,4-diene-3,20-dione
16α-chloro-9β,10α-pregna-1,4-diene-3,20-dione
16α-bromo-9β,10α-pregna-1,4-diene-3,20-dione
16α-fluoro-3-methoxy-9β,10α-pregna-3,5-dien-20-one
16α-chloro-3-ethoxy-9β,10α-pregna-3,5-dien-20-one
16α-bromo-3-benzyloxy-9β,10α-pregna-3,5-dien-20-one
16α-chloro-3-acetoxy-9β,10α-pregna-3,5-dien-20-one The 16-halogen-9β,10α-pregnanes of the general Formula I can be prepared in accordance with methods known per se for the preparation of the corresponding steroids of the normal series.

A preferred manufacturing process consists in reacting a compound of the general Formulas II or III:

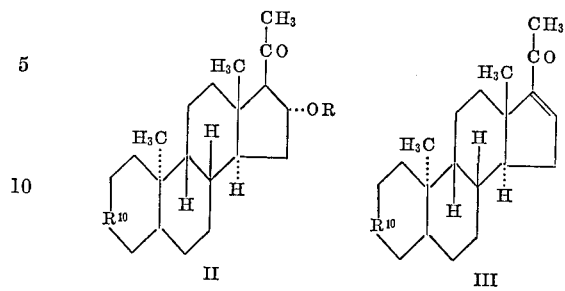

wherein $R^{10}$ represents a 3-keto-$\Delta^4$-, 3-keto-$\Delta^{4,6}$-, 3-keto-$\Delta^{1,4}$- or a 3-keto-$\Delta^{1,4,6}$-system, and OR represents a free or esterified hydroxy group, with hydrogen fluoride, hydrogen chloride or hydrogen bromide and, if desired, the 16-halogen compound obtained is dehydrogenated in 1- and/or 6-position or converted into a 3-enol ether or a 3-enol ester in further process steps.

Especially preferred as starting materials are compounds of the Formulas IIa and IIIa

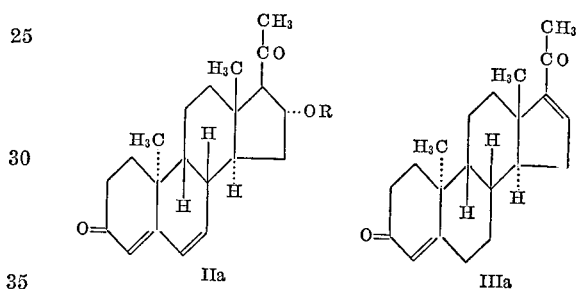

wherein in the Formula IIa OR represents a free or esterified hydroxy group.

The reaction of the compounds of the general Formulas II and III with hydrogen fluoride, hydrogen chloride or hydrogen bromide is preferably effected at room temperature, e.g. at 20–25° in a non-ketonic, non-alcoholic, inert organic solvent, e.g. in an aliphatic or aromatic hydrocarbon such as petroleum ether or benzene, toluene or xylene, or in a halogenated or nitrated hydrocarbon such as methylene chloride, chloroform, carbon tetrachloride, chlorobenzene or nitrobenzene, respectively, or in ethers such as diethyl ether, dioxane or tetrahydrofuran.

The hydrogen fluoride, hydrogen chloride or hydrogen bromide is suitably passed through a solution of the compounds of the general Formulas II or III in one of the solvents mentioned as a dry gas, e.g., for 0.5 to 10 hours. The course of the reaction can be followed by thin layer chromatography or U.V. spectrometry of the reaction mixture.

The 16-halogen compounds obtained can be dehydrogenated in 1- and/or 6-position or converted into a 3-enol ether or 3-enol ester in further process steps, if desired.

The introduction of double bonds in 1- and/or 6-position can be effected in accordance with methods known per se from the normal series of steroids, e.g. by treatment with dehydrogenating agents such as chloranil or 2,3-dichloro-5,6-dicyanobenzoquinone. A $\Delta^1$-double bond can also be introduced with iodine pentoxide, periodic acid, selenium dioxide, lead tetraacetate or by microbiological methods.

Methods which are known per se from the chemistry of the normal steroids can find use for the enol etherification or enol esterification of the 3-keto-$\Delta^4$-system.

The enol esterification can, for example, be carried out by reacting the steroid with an acylating agent in the presence of a catalyst, e.g. with isopropenyl acetate in the presence of p-toluene sulfonic acid.

The enol etherification can, for example, be carried out by reacting the steroid with an alcohol, such as methanol, ethanol, benzyl alcohol in the presence of a catalyst, such as p-toluene sulfonic acid, or by reacting with an orthoformic acid ester in the presence of a catalyst, e.g. with orthoformic ester ethyl ester and hydrogen chloride, or with a dialkoxy propane, e.g. dimethoxy propane in methanol-dimethyl formamide in the presence of a catalyst, such as p-toluene sulfonic acid.

The alkyl group in a 3-alkoxy group is preferably an aliphatic, cycloaliphatic or araliphatic alkyl group having 1–10 C-atoms. Examples of such groups are: methyl, ethyl, propyl, tert.-butyl, cyclopentyl, cylohexyl, benzyl and dihydropyranyl.

An esterified 17-hydroxy group is preferably an acyloxy group of which the acyl residue is derived from a saturated or unsaturated aliphatic or cyloaliphatic, an araliphatic or aromatic carboxylic acid having 1–20 C-atoms. Examples of such acids are: formic acid, acetic acid, pivalic acid, propionic acid, butyric acid, caproic acid, heptanoic acid, oleic acid, palmitic acid, stearic acid, succinic acid and benzoic acid.

The starting compounds of the Formulas II and III, insofar as they are not known, can be prepared in accordance with known methods.

Starting compounds of the Formula II, wherein OR represents a hydroxy group can be prepared microbiologically from the corresponding unsubstituted compounds, e.g. by incubation with Sepedonium ampullosporum. The 16-hydroxy compounds can then be converted into the starting compounds of the Formula II wherein OR represents an esterified hydroxy group by treatment with an acylating agent, e.g. an acid anhydride in the presence of an acid binding agent. Starting compounds of the Formula III can be prepared from the corresponding 16-hydroxy compounds of the Formula II by dehydration, e.g. with catalytic amounts of p-toluene sulfonic acid in boiling benzene.

The compounds of this invention possess hormonal, in particular progestational activity. They can be used as medicaments in the form of pharmaceutical preparations which contain them in admixture with a pharmaceutical organic or inorganic inert carrier material suitable for enteral or parenteral administration, such as, for example, water, gelatin, lactose, starch, magnesium stearate, talc, vegetable oils, gums, polyalkylene glycols or petroleum jelly. The pharmaceutical preparations may be in solid form (e.g. as tablets, dragées, suppositories or capsules) or in a liquid form (e.g. as solutions, suspensions or emulsions). If desired, they may be sterilized and/or contain auxiliary substances such as preserving, stabilizing, wetting or emulsifying agents, salts for varying the osmotic pressure or buffers. They may also contain, in combination, other therapeutically valuable substances.

In the following examples all temperatures are given in degrees centigrade.

EXAMPLE 1

A stream of dry hydrogen chloride was passed through a solution of 0.5 g. of 9β,10α-pregna-4,16-diene-3,20-dione in 35 ml. of chloroform for 2 hours at 0° and for 4 hours at 20–25°. Thereafter, the reaction mixture was allowed to stand for 18 hours at room temperature and then taken up in ethyl acetate. The extract was washed with water, hydrogen carbonate solution and water, dried over sodium sulfate and evaporated. The residue afforded (after recrystallisation from ethyl acetate/isopropyl ether) 392 mg. of 16α-chloro-9β,10α-pregn-4-ene-3,20-dione. Melting point 152–153°, UV: $\lambda_{max.}$239 mμ, $\epsilon$=16,800, $[\alpha]_{589}$=—74° (in dioxane).

The starting 9β,10α-pregna-4,16-diene-3,20-dione was prepared as follows: 6.0 g. of 16α-hydroxy-9β,10α-pregn-4-ene-3,20-dione were dissolved in 300 ml. of benzene while heating. After the addition of 0.6 g. of p-toluene sulfonic acid the solution was refluxed under nitrogen.

After 20 minutes, ca. 200 ml. of benzene were slowly distilled off using a short Vigreux column. The residue was taken up in ethyl acetate, the ethyl acetate solution was washed with sodium hydrogen carbonate solution, dried over sodium sulfate and evaporated. The residue was treated with charcoal in methanolic solution and recrystallized from methanol/isopropyl ether. There was obtained 9β,10α,pregna-4,16-diene-3,20-dione. Yield 86%, melting point 164–166°, UV: $\lambda_{max.}$ 240 mμ, $\epsilon$=25,300.

EXAMPLE 2

A stream of dry hydrogen chloride was passed through a solution of 500 mg. of 16α-acetoxy-9β,10α-pregna-4,6-diene-3,20-dione in 50 ml. of chloroform for 6 hours at 0°. After the addition of ethyl acetate, the reaction mixture was worked up according to the procedure of Example 1. There were obtained 340 mg. of 16α-chloro-9β,10α-pregna-4,6-diene-3,20-dione. Melting point 156° (from methylene chloride/isopropyl ether). UV: $\lambda_{max.}$ 284 mμ, $\epsilon$=26,000, $[\alpha]_{589}$=—471° (in dioxane).

The same compound was prepared in an analogous manner using 9β,10α-pregna-4,6,16-triene-3,20-dione and 16α-hydroxy-9β,10α-pregna-4,6-diene-3,20-dione as the starting material.

The 9β,10α-pregna-4,6,16-triene-3,20-dione can be prepared by a procedure analogous to that described in Example 1 by dehydration of 16α-hydroxy-9β,10α-pregna-4,6-diene-3,20-dione. Melting point 129–130°, UV: $\lambda_{max.}$ 238 and 285 mμ, $\epsilon$=11,700 and 25,800, respectively, $[\alpha]_{589}$=—417° (in dioxane).

The 16α - acetoxy - 9β,10α-pregna-4,6-diene-3,20-dione used as the starting material in the above example can be prepared by acetylating 16α-hydroxy-9β,10α-pregna-4,6-diene-3,20-dione with acetic anhydride in the presence of pyridine. Melting point 126–127° (from acetone-hexane), UV: $\lambda_{max.}$ 284 mμ, $\epsilon$=26,000, $[\alpha]_{-89}$=—501° (in dioxane).

EXAMPLE 3

1.3 g. of 2,3-dichloro-5,6-dicyanobenzoquinone were added to a solution of 1.0 g. of 16α-chloro-9β,10α-pregna-4,6-diene-3,20-dione in 50 ml. of dioxane containing 1% of hydrogen chloride. The reaction mixture was stirred under nitrogen at room temperature for 2.5 hours. After the addition of 0.5 g. of solid sodium hydrogen carbonate stirring was continued for a further 15 minutes. The solution was then filtered and the filtrate concentrated. By chromatography on 100 g. of silicagel using benzene/acetone (9:1) as the elution agent there was obtained 0.5 g. of 16α-chloro-9β,10α-pregna1,4,6-triene,3,20-dione. Melting point 154° (from methylene chloride/isopropyl ether). UV: $\lambda_{max.}$ 221, 251 and 300 mμ, $\epsilon$=12,600, 9,900 and 13,-100, respectively. $[\alpha]_{589}$=—340° (in dioxane).

We claim:
1. 16-halogen-9β,10α-pregnanes of the general formula

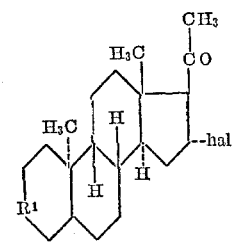

wherein $R^1$ is a member selected from the group consisting of a 3-keto-$\Delta^4$-, 3-keto-$\Delta^{4,6}$-, 3-keto-$\Delta^{1,4}$-, 3-keto-$\Delta^{1,4,6}$-, 3-alkoxy-$\Delta^{3,5}$- and a 3-acyloxy-$\Delta^{3,5}$-system, and hal is a member selected from the group consisting of chloro, bromo and fluoro.

2. A 16-halogen-9β,10α-pregnane of claim 1 said compound specifically being 16α-chloro-9β,10α-pregn-4-ene-3,20-dione.

3. A 16-halogen-9β,10α-pregnane of claim 1 said compound specifically being 16α-chloro-9β,10α-pregna-4,6-diene-3,20-dione.

4. A 16-halogen-9β,10α-pregnane of claim 1 said compound specifically being 16α-chloro-9β,10α-pregna-1,4,6-triene-3,20-dione.

5. 16α-acetoxy-9β,10α-pregna-4,6-diene-3,20-dione.

References Cited

Lederle, J. Med. and Pharm. Chem. (1962), 5, p.950.
Hoffman et al., J. Med. and Pharm. Chem., September 1962, No. 5, p. 966.

E. L. ROBERTS, *Primary Examiner.*

U.S. Cl. X.R.

167—74; 195—51; 260—397.4

PO-1050
(5/69)

UNITED STATES PATENT OFFICE
CERTIFICATE OF CORRECTION

Patent No. 3,437,675             Dated   April 8, 1969

Inventor(s)   ENGBERT HARMEN REERINK ET AL

It is certified that error appears in the above-identified patent and that said Letters Patent are hereby corrected as shown below:

Column 1, line 19, (in the abstract) "fluoro 1" should read -- fluoro- --; Column 2, line 46, "notrobenzene" should read -- nitrobenzene --; Column 4, line 30, "mµ" should read -- nm --; Column 4, line 37, "mµ" should read -- nm --; same line, "$[\alpha]_{89}$" should read -- $[\alpha]_{589}$ --;

Column 4, line 52, "mµ" should read -- nm --.

Signed and sealed this 3rd day of March 1970.

(SEAL)
Attest:

Edward M. Fletcher, Jr.
Attesting Officer

WILLIAM E. SCHUYLER, JR.
Commissioner of Patents